(12) United States Patent
Zhang

(10) Patent No.: US 11,998,791 B2
(45) Date of Patent: Jun. 4, 2024

(54) BARBELL CLAMPING ASSEMBLY

(71) Applicant: Yixiao Zhang, Heyuan (CN)

(72) Inventor: Yixiao Zhang, Heyuan (CN)

(*) Notice: Subject to any disclaimer, the term of this patent is extended or adjusted under 35 U.S.C. 154(b) by 455 days.

(21) Appl. No.: 17/523,941

(22) Filed: Nov. 11, 2021

(65) Prior Publication Data

US 2023/0071147 A1 Mar. 9, 2023

(30) Foreign Application Priority Data

Sep. 3, 2021 (CN) .......................... 202122117798.6

(51) Int. Cl.
*A63B 21/072* (2006.01)
*F16B 2/18* (2006.01)

(52) U.S. Cl.
CPC ...... *A63B 21/0728* (2013.01); *A63B 21/0724* (2013.01); *F16B 2/185* (2013.01)

(58) Field of Classification Search
CPC .. A63B 21/0728; F16B 2/185; Y10T 403/583
See application file for complete search history.

(56) References Cited

U.S. PATENT DOCUMENTS

| | | | | |
|---|---|---|---|---|
| 4,639,979 A | * | 2/1987 | Polson | F16B 7/1418 |
| | | | | 285/373 |
| D537,334 S | * | 2/2007 | Lee | D8/396 |
| 7,201,351 B2 | * | 4/2007 | Stigler | F16L 55/035 |
| | | | | 248/74.1 |
| 7,261,263 B2 | * | 8/2007 | Baker | A47F 5/04 |
| | | | | 248/316.1 |
| D941,408 S | * | 1/2022 | Jones | D21/694 |
| D979,677 S | * | 2/2023 | Liu | D21/694 |
| D1,010,755 S | * | 1/2024 | Jones | D8/394 |
| 2003/0045407 A1 | * | 3/2003 | Schiff | A63B 21/0728 |
| | | | | 482/107 |
| 2008/0167168 A1 | * | 7/2008 | Hurst | A63B 21/075 |
| | | | | 482/132 |
| 2008/0287271 A1 | * | 11/2008 | Jones | F16B 2/10 |
| | | | | 482/107 |
| 2016/0193494 A1 | * | 7/2016 | Roepke | A63B 21/0728 |
| | | | | 482/107 |

(Continued)

FOREIGN PATENT DOCUMENTS

CN 116617621 A * 8/2023
WO WO-2017046731 A1 * 3/2017

*Primary Examiner* — Joshua T Kennedy
(74) *Attorney, Agent, or Firm* — WPAT, P.C

(57) ABSTRACT

The invention relates to the field of barbell clamping technologies and particularly to a barbell clamping assembly including a barbell clamping body. A replaceable core is inserted into the barbell clamping body. Press blocks are inserted into the replaceable core. The replaceable core is connected to the press blocks through first springs. A hexagon bolt is inserted into the barbell clamping body. A rotating rod is inserted into the hexagon bolt. A handle is sleeved onto the rotating rod. A fixing block is disposed on a side of the handle. A clamping structure is inserted into the barbell clamping body and includes first and second clamping blocks inserted into the barbell clamping body. The first and seconds clamping blocks are connected to the barbell clamping body by second springs, and an arc fixing groove is disposed in the barbell clamping body and between the first and second clamping blocks.

8 Claims, 2 Drawing Sheets

(56) References Cited

U.S. PATENT DOCUMENTS

| | | | | |
|---|---|---|---|---|
| 2019/0383431 A1* | 12/2019 | Magagna | ................ | F16L 33/06 |
| 2020/0094100 A1* | 3/2020 | Garcia Castillo | .. | A63B 21/0601 |
| 2020/0171339 A1* | 6/2020 | Jones | ................ | A63B 21/0728 |
| 2021/0001166 A1* | 1/2021 | Stilson | ............... | A63B 21/0724 |
| 2021/0060376 A1* | 3/2021 | Kehlenbach | ....... | A63B 21/0728 |
| 2021/0283453 A1* | 9/2021 | Davies | ............... | A63B 21/0728 |
| 2022/0143453 A1* | 5/2022 | Martin | ...................... | F16B 2/06 |
| 2022/0331643 A1* | 10/2022 | Kehlenbach | ....... | A63B 21/0724 |

\* cited by examiner

BARBELL CLAMPING ASSEMBLY

FIELD OF THE INVENTION

The invention relates to the field of barbell clamping technologies, and more particularly to a barbell clamping assembly.

BACKGROUND OF THE INVENTION

A barbell is a kind of exercise training equipment for core training, as well as equipment used for weight lifting. The barbell exercise belongs to weight training, and only is an exercise of using barbell training equipment to enhance muscle strength. The barbell can also be used for core training to promote overall coordination, and resulting from the heavy weight of the barbell, it may have a certain risk. In order to maintain positions of interchangeable weights of the barbell on a barbell bar (also referred to as lifting bar), barbell clamps need to be used to fix the positions of the interchangeable weights of the barbell, so as to ensure the safety of users. At present, there are many sizes of barbell bars on the market, so matching barbell clamps on the market are also multi-sized, and one size of barbell bar corresponds to one size of barbell clamp, so that users need to buy multiple matching barbell clamps as per the multiple sizes of barbell bars. Moreover, because there are several sizes of barbell bars on the market, and some of users are not aware of the sizes of the barbell bars before purchasing, there will be a phenomenon that the size is not suitable after purchase, which is very troublesome. In addition, the traditional barbell clamp is a spiral lock, so that when replacing the interchangeable weights (weight plates), it needs to be rotated slowly for the replacing, and thus it is very time-consuming.

SUMMARY OF THE INVENTION

Accordingly, a technical problem to be solved by the invention is to provide a barbell clamping assembly which can meet size requirements of different barbell bars by installing replaceable inner cores corresponding to actual size needs to lock barbell bars of different sizes without replacing the entire barbell clamping assembly, and realize fast/quick replacement.

Specifically, a technical solution proposed by an embodiment of the invention is to provide a barbell clamping assembly. The barbell clamping assembly may include a barbell clamping body. An replaceable core is inserted in the barbell clamping body. Multiple (i.e., more than one) press blocks are inserted in the replaceable core. The replaceable core is connected to the press blocks through first springs respectively. A hexagon bolt is inserted into the barbell clamping body. A rotating rod is located at a side of the barbell clamping body and inserted into the hexagon bolt. A handle is sleeved onto the rotating rod. A fixing block is disposed at a side of the handle. A clamping structure is inserted into the barbell clamping body. The clamping structure includes a first clamping block and a second clamping block both inserted into the barbell clamping body. The first clamping block and the second clamping block are connected to the barbell clamping body through second springs respectively. An arc fixing groove is disposed in the barbell clamping body and between the first clamping block and the second clamping block.

In an embodiment, multiple heat dissipation holes are disposed in the barbell clamping body.

In an embodiment, a stepped groove is disposed in the barbell clamping body and configured to match with the insertion of the replaceable core.

In an embodiment, a first magnet is disposed at a side of the arc fixing groove and in the barbell clamping body, and a second magnet matching with the first magnet is disposed in the fixing block and magnetically attractive to the first magnet.

In an embodiment, first grooves are disposed in the barbell clamping body and configured to match with movements of the first clamping block and the second clamping block respectively.

In an embodiment, an antiskid sheet is disposed in the handle.

In an embodiment, an elastic groove is disposed in the barbell clamping body, and an elastic silicone body is disposed around the elastic groove and in the barbell clamping body.

In an embodiment, a size of the replaceable core 2 is one of four sizes, and the four sizes respectively are 29 mm, 28 mm, 25.4 mm and 24 mm in diameter.

The invention may have beneficial effects as follows:

The invention has complete functions, and the barbell clamping assembly includes the barbell clamping body and the replaceable core, the interior of the barbell clamping body has an installation cavity/chamber, and the installation cavity is provided with the stepped groove to match with insertion of the replaceable core. When the handle is opened to about up 180 degrees, the inner diameter of the installation cavity of the barbell clamping body is the largest, which is a state for installing the replaceable core, and the replaceable core correspondingly can be inserted into the stepped groove of the installation cavity of the barbell clamping body for installation. During the installation, a groove at the bottom of the replaceable core shall be aligned with the stepped groove inside the installation cavity of the barbell clamping body. The internal shape of the barbell clamping body is a cylinder, and the replaceable core is a hollowed cylinder. The cylinder has no corner, low friction and is easy to rotate. The design of the bottom groove can effectively prevent the rotation between objects caused by the movement between cylinders, and ensure the effective locking of the barbell clamping body with the replaceable core, so as to make it fixed and no longer rotating. After quickly inserting a barbell bar, through the matching arrangement of the press blocks and the first springs, the friction between the replaceable core and the barbell bar can be increased when the replaceable core locks the barbell bar tightly. For the head portion of the handle, the handle can be pressed through the antiskid sheet; and when the handle is pressed to about down 180 degrees, the handle fits the barbell clamping body and can avoid to be rebounded, the fixing block is inserted between the first clamping block and the second clamping block, the second springs are contracted in the first grooves, so that the fixing block is inserted between the first clamping block and the second clamping block and fixed insides of the first clamping block and the second clamping block. By way of settings of shapes of the first clamping block and the second clamping block and elastic support forces of the second springs, the position of the fixing block can be fixed, so that the handle is in a closed and locked state. By means of the matching arrangement of the elastic groove and the elastic silicone body, the barbell clamping body can be reduced in wear and loss during an opening process. The hexagon bolt does not need to be removed/detached during opening and closing of the barbell clamping body. The replaceable core may have four sizes in total, and the four sizes are respectively 29 mm 28 mm, 25.4 mm and 24 mm; and moreover the barbell body itself has a diameter of 30 mm, so that the barbell clamping assembly may have five sizes of inner cores commonly used in the market, i.e., 30 mm, 29 mm, 28 mm, 25.4 mm and 24 mm in size. Through the replacements of inner cores with different sizes, it can meet the needs of barbell bars with different sizes, so as to meet most of needs of the market and provide the function of locking weight plates. In short, the invention can meet size requirements of different barbell bars by installing replaceable inner cores corresponding to actual size needs to lock barbell bars of different sizes without replacing the entire barbell clamping assembly and realize fast replacement, the versatility of the barbell clamping assembly can be improved.

Figure 1:
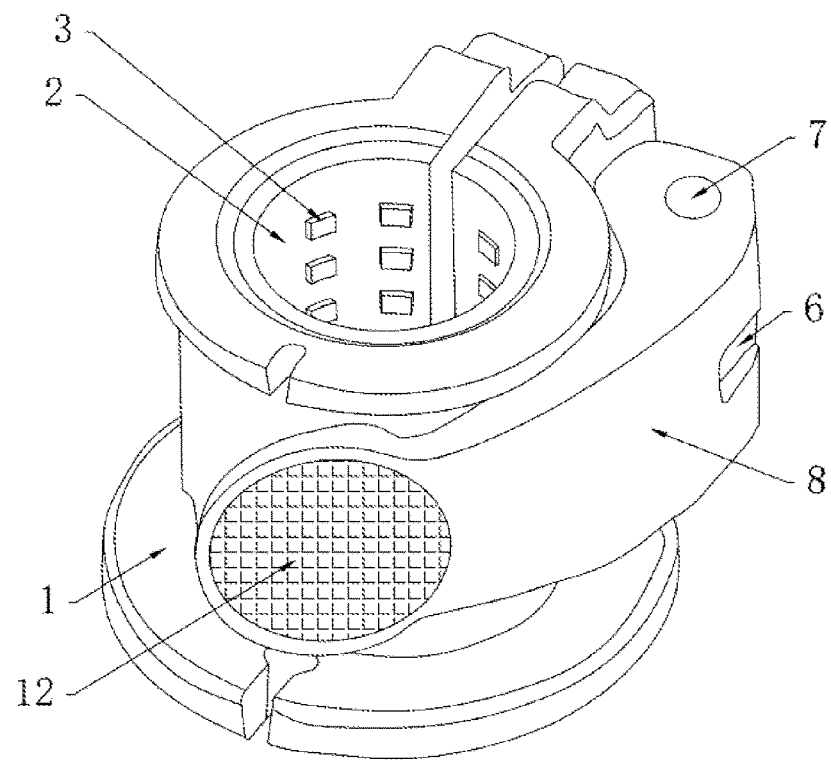
FIG. 1 is a schematic overall structural view of a barbell clamping assembly according to an embodiment of the invention.

Description of reference numerals: 1, barbell clamping body; 2, replaceable core; 3, press block; 4, elastic silicone body; 5, first spring; 6, hexagon bolt; 7, rotating rod; 8, handle; 9, fixing block; 10, clamping structure; 10.1, first clamping block; 10.2, second clamping block; 10.3, second spring; 10.4, arc fixing groove; 11, heat dissipation hole; 12, antiskid sheet.

DETAILED DESCRIPTION OF EMBODIMENTS

The invention will be described below in detail with reference to the accompanying drawings.

In order to realize a barbell clamping assembly which can meet size requirements of different barbell bars by installing replaceable inner cores corresponding to actual size needs to lock barbell bars of different sizes without replacing the entire barbell clamping assembly and achieve fast replacement, an embodiment of the invention provides a barbell clamping assembly as shown in the drawings. In particular, the barbell clamping assembly includes a barbell clamping body 1. An replaceable core (also referred to as detachable core) 2 is inserted in the barbell clamping body 1. Multiple (i.e., more than one) press blocks 3 are inserted in the replaceable core 2. The replaceable core 2 is connected to the press blocks 3 through first springs 5 respectively. A hexagon bolt 6 is inserted into the barbell clamping body 1. A rotating rod 7 is located at a side of the barbell clamping body 1 and inserted into the hexagon bolt 6. A handle 8 is sleeved onto the rotating rod 7. A fixing block 9 is disposed at a side of the handle 8. A clamping structure 10 is inserted into the barbell clamping body 1. The clamping structure 10 comprises a first clamping block 10.1 and a second clamping block 10.2 both inserted into the barbell clamping body 1. The first clamping block 10.1 and the second clamping block 10.2 are connected to the barbell clamping body 1 through second springs 10.3 respectively. An arc fixing groove 10.4 is disposed in the barbell clamping body 1 and between the first clamping block 10.1 and the second clamping block 10.2.

In an embodiment of the invention, multiple heat dissipation holes 11 are disposed in the barbell clamping body 1.

Figure 2:
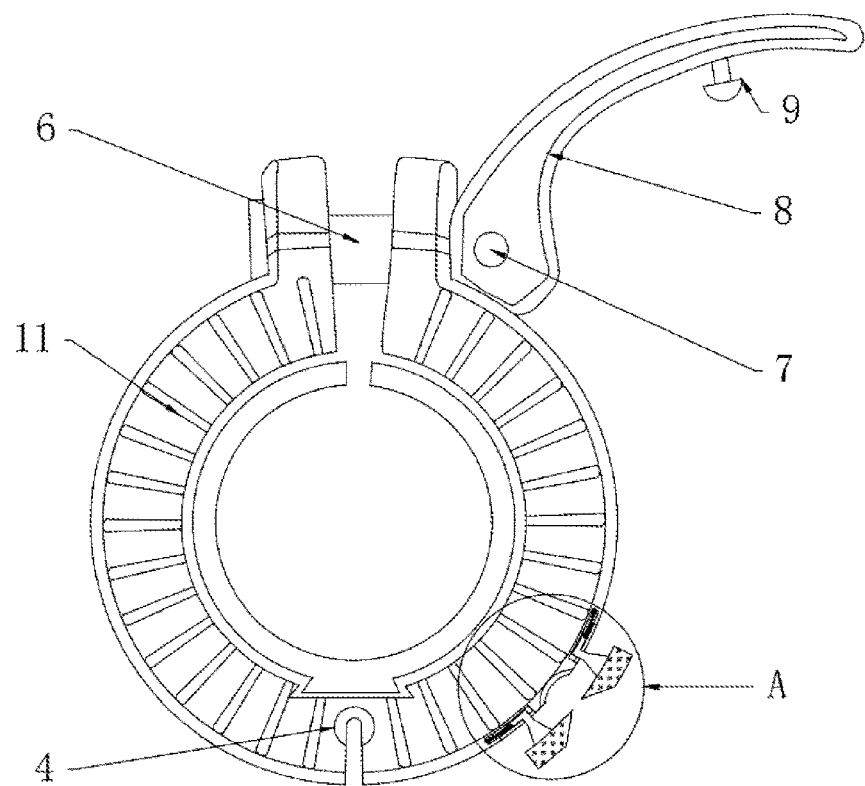
FIG. 2 is a schematic cross-sectional view of the barbell clamping assembly according to an embodiment of the invention.
Figure 3:
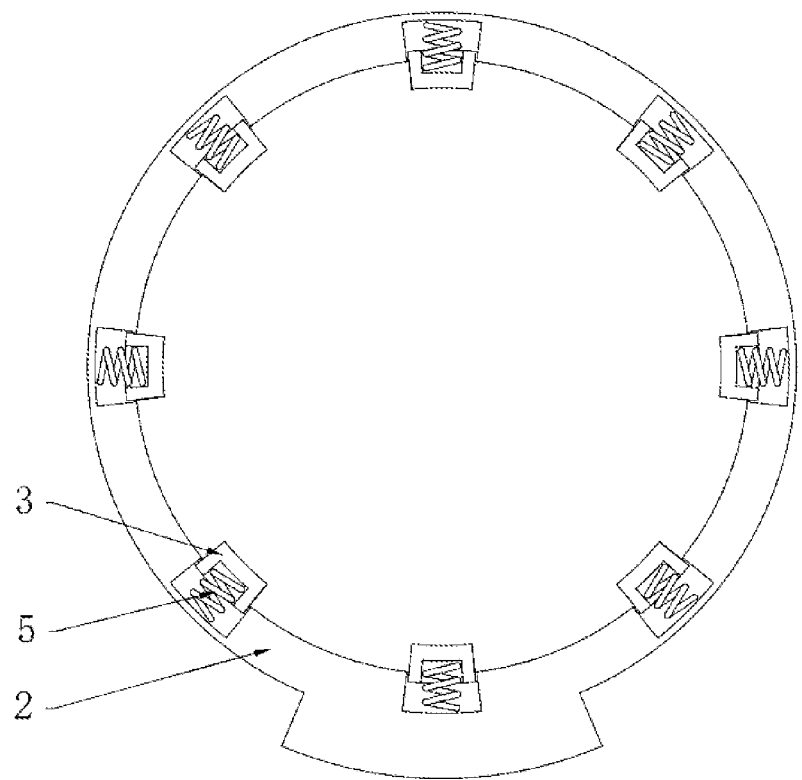
FIG. 3 is a schematic cross-sectional view of a replaceable core of the barbell clamping assembly according to an embodiment of the invention.
Figure 4:
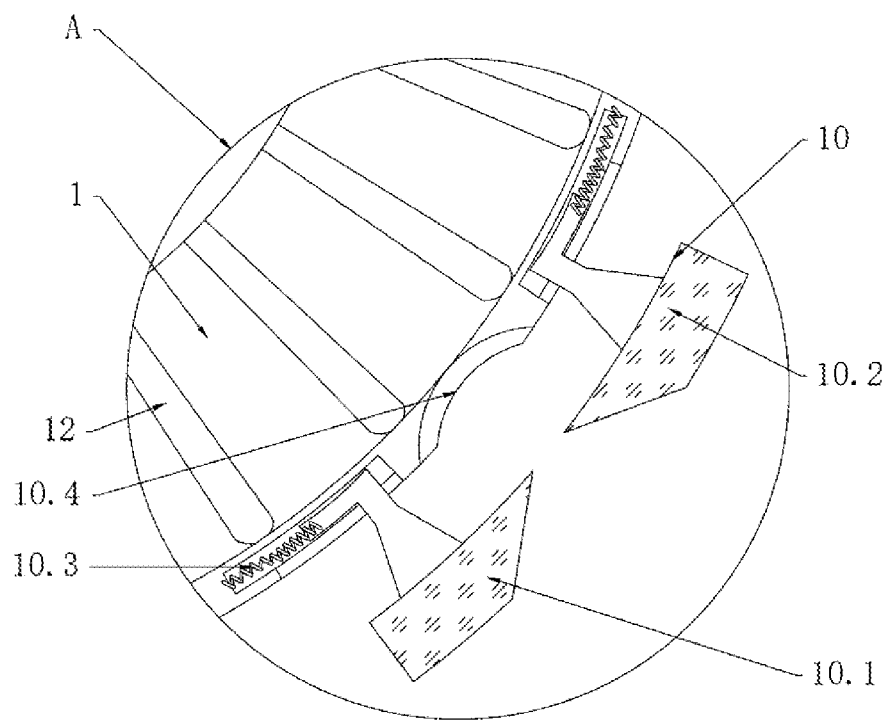
FIG. 4 is a schematic enlarged structural view of the portion A in FIG. 2 of the barbell clamping structure according to an embodiment of the invention.

In an embodiment of the invention, a stepped groove (see FIG. 2) is disposed in the barbell clamping body 1 and configured (i.e., structured and arranged) to match with the insertion of the replaceable core 2.

In an embodiment of the invention, a first magnet is disposed at a side of the arc fixing groove 10.4 and in the barbell clamping body 1, and a second magnet matching with the first magnet is disposed in the fixing block 9 and magnetically attractive to the first magnet. As a result, the fixing block 9 is magnetically attractable to the barbell clamping body 1.

In an embodiment of the invention, first grooves are disposed in the barbell clamping body 1 and configured to match with movements of the first clamping block 10.1 and the second clamping block 10.2 respectively.

In an embodiment of the invention, an antiskid sheet 12 is disposed in the handle 8.

In an embodiment of the invention, an elastic/resilient groove (see FIG. 2) is disposed in the barbell clamping body 1, and an elastic silicone body 4 is disposed around the elastic groove and in the barbell clamping body 1.

In an embodiment of the invention, a size of the replaceable core 2 is one of four sizes, and the four sizes respectively are 29 mm, 28 millimeters (mm), 25.4 mm and 24 mm in diameter.

Sum up, the illustrated barbell clamping assembly includes the barbell clamping body 1 and the replaceable core 2, the interior of the barbell clamping body 1 has an installation cavity, and the installation cavity is provided with a stepped groove to match with insertion of the replaceable core 2, when the handle 8 is opened to about up 180 degrees, the inner diameter of the installation cavity of the barbell clamping body 1 is the largest, which is a state for installation of the replaceable core 2, and the replaceable core 2 correspondingly can be inserted into the stepped groove of the installation cavity of the barbell clamping body 1 for installation. During the installation, a groove at the bottom of the replaceable core 2 shall be aligned with the stepped groove inside the installation cavity of the barbell clamping body 1. The internal shape of the barbell clamping body 1 is a cylinder, and the replaceable core 2 is a discontinuous hollowed cylinder. The cylinder has no corner, low friction and is easy to rotate. The design of the bottom groove can effectively prevent the rotation between objects caused by the movement between cylinders, and ensure effective locking of the barbell clamping body 1 with the replaceable core 2, so as to make it fixed and no longer rotating. After quickly inserting a barbell bar, through the matching arrangement of the press blocks 3 and the first springs 5, the friction between the replaceable core 2 and the barbell bar can be increased when the replaceable core 2 locks the barbell bar tightly. For the head portion of the handle 8, the handle 8 can be pressed through the antiskid sheet 12; and when the handle 8 is pressed to about down 180 degrees and the handle 8 fits the barbell clamping body 1, the fixing block 9 is inserted between the first clamping block 10.1 and the second clamping block 10.2, the second springs 10.3 are contracted in the first grooves, so that the fixing block 9 is inserted between the first clamping block 10.1 and the second clamping block 10.2 and fixed insides of the first clamping block 10.1 and the second clamping block 10.2. By way of settings of shapes of the first clamping block 10.1 and the second clamping block 10.2 and elastic support forces of the second springs 10.3, the position of the fixing block 9 can be fixed, so that the handle 8 is in a closed and locked state. By means of the matching arrangement of the elastic groove and the elastic silicone body 4, the barbell clamping body 1 can be reduced in wear and loss during an opening process. The hexagon bolt 6 does not need to be removed/detached during opening and closing of the barbell clamping body 1. The replaceable core 2 may have four sizes in total, and the four sizes are respectively 29 mm, 28 mm, 25.4 mm and 24 mm; and moreover the barbell body itself has a diameter of 30 mm, so that the barbell clamping assembly may have four sizes of inner cores commonly used in the market, i.e., 30 mm, 29 mm, 28 mm, 25.4 mm and 24 mm in size. Through the replacements of inner cores with different sizes, it can meet the needs of barbell bars with different sizes, so as to meet most of needs of the market and provide the function of locking interchangeable weights (also referred to as weight plates).

The above description of the invention and its embodiments are not restrictive. What are shown in the accompanying drawings are only some of embodiments of the invention, and the actual structure is not limited to this. All in all, if ordinary technicians in the art are enlightened, structures and embodiments similar to the disclosed technical solution made without creative effort on the prerequisite of being without departing from the creative purpose of the invention should belong to the protection scope of the invention.

What is claimed is:

1. A barbell clamping assembly comprising:
    a barbell clamping body (1);
    a replaceable core (2) inserted into the barbell clamping body (1);
    a plurality of press blocks (3) inserted into the replaceable core (2), wherein the replaceable core (2) is connected to the plurality of press blocks (3) through first springs (5);
    a hexagon bolt (6) inserted into the barbell clamping body (1);
    a rotating rod (7) located at a side of the barbell clamping body (1) and inserted into the hexagon bolt (6);
    a handle (8) sleeved onto the rotating rod (7);
    a fixing block (9) disposed on a side of the handle (8); and
    a clamping structure (10) inserted into the barbell clamping body, wherein the clamping structure (10) comprises a first clamping block (10.1) and a second clamping block (10.2) both inserted into the barbell clamping body (1), the first clamping block (10.1) and the second clamping block (10.2) are connected to the barbell clamping body (1) by second springs (10.3) respectively, and an arc fixing groove (10.4) is disposed in the barbell clamping body (1) and between the first clamping block (10.1) and the second clamping block (10.2).

2. The barbell clamping assembly according to claim 1, wherein a plurality of heat dissipation holes (11) are disposed in the barbell clamping body (1).

3. The barbell clamping assembly according to claim 1, wherein a stepped groove is disposed in the barbell clamping body (1) to match with the replaceable core (2) inserted in the barbell clamping body (1).

4. The barbell clamping assembly according to claim 1, wherein a first magnet is disposed at a side of the arc fixing groove (10.4) and in the barbell clamping body (1), and a second magnet matching with the first magnet is disposed in the fixing block (9) and magnetically attractive to the first magnet.

5. The barbell clamping assembly according to claim 1, wherein first grooves are disposed in the barbell clamping body (1) and configured to match with movements of the first clamping block (10.1) and the second clamping block (10.2) respectively.

6. The barbell clamping assembly according to claim 1, wherein an antiskid sheet is disposed in the handle.

7. The barbell clamping assembly according to claim 1, wherein an elastic groove is disposed in the barbell clamping body (1), and an elastic silicone body (4) is arranged around the elastic groove and in the barbell clamping body (1).

8. The barbell clamping assembly according to claim 1, wherein a size of the replaceable core (2) is one of four sizes, and the four sizes are 29 millimeters (mm), 28 millimeters (mm), 25.4 mm and 24 mm in diameter.

\* \* \* \* \*